United States Patent Office 2,923,095
Patented Feb. 2, 1960

2,923,095
ORGANOSILICIC DERIVATIVES IN AGRICULTURE AND ARBORICULTURE

Rene Joseph Edouard Magimel-Pelonnier, Bordeaux, and Leon Michel Bernard Etcheverry, St-Etienne de Baigorry, France, assignors to Societe des Usines Chimiques Rhone-Poulenc, Paris, France, a French body corporate No Drawing. Application May 6, 1958
Serial No. 733,253

Claims priority, application France May 6, 1957

2 Claims. (Cl. 47—58)

The present invention relates to the use of organosilicic derivatives for modifying or controlling the degree of hydration of, and transpiration of water from, vegetable material of the nature of growing plants, plants removed from the ground, cuttings of plants, seeds and the like, and thus obtaining valuable effects in agriculture and in arboriculture.

Organosilicic derivatives are well known for their water-repelling properties and some of their applications are based mainly on this property. It is known in particular to use organosilicic derivatives for protecting fabrics, brickwork, and articles of wood and other materials against the action of water or against the action of mould, the development of which is promoted by a certain degree of humidity.

It has now been discovered that organosilicic derivatives may be employed in agriculture and in arboriculture to obtain various effects which appear to be connected either with a modification of the degree of hydration at the level of certain vegetable organs or with a reduction in the dehydration of the entire plant.

According to the present invention, therefore, there is provided a process for controlling the hydration level of plants, parts thereof and seeds, which comprises applying thereto a composition comprising an organosilicic derivative and a diluent therefor.

According further to the present invention there is provided a process for controlling the hydration level of plants, parts thereof and seeds, which comprises applying thereto a composition comprising an organosilicic derivative and a diluent therefor, the said process serving to protect such materials against undue dehydration during transport.

The invention further includes compositions for use in the said process as hereinafter set forth.

Organosilicic derivatives which can be used according to the invention are well known and may be chosen from the standard commercial products. They comprise in particular silanols, siloxanols, alkoxysilanes, polysilanes, polysiloxanes and compounds having both polysilane and polysiloxane linkages. The organic groups attached to the silicon may vary fairly widely, but in practice it is the derivatives containing lower alkyl groups, such as methyl, and aryl groups such as phenyl, that are most commonly available. It is thus possible to utilise to advantage the dimethylsiloxanes, the methylhydrogenopolysiloxanes and siloxanic compounds derived from methylpolysilanes having hydrolysable groups. The organopolysiloxanes may contain free hydroxyl groups directly attached to silicon atoms. The invention also includes the use of organosilicic derivatives whose organic groupings themselves carry substituents.

The organosilicic derivatives are employed in association with an appropriate diluent. Solid diluents may be employed, but liquid dilutions generally constitute the most satisfactory form of application. The organosilicic derivative concentration in these dilutions may vary in accordance with the nature of the treatments to be applied and the desired period of action.

Thus organosilicic compounds may be employed in combination with hydrophobic substances, such for example as: hydrophobic powder, such as magnesium trisilicate, micro- or macrocrystalline animal, vegetable or mineral waxes, and animal, vegetable or mineral oils.

Solutions for spraying may be prepared by dissolving an organopolysiloxane in a mineral oil. By the addition of non-ionic surface-active agents to oily solutions of organopolysiloxane, it is possible to obtain concentrates which self-emulsify in contact with water.

The organopolysiloxanes may also be employed as aqueous emulsions, either of the oil-in-water type or of the water-in-oil type. In these emulsions, the organopolysiloxane derivative may be associated with a mineral oil or with aromatic solvents. The preparation of such emulsions may be carried out by the usual techniques, employing the usual emulsifying agents and effecting the homogenisation in a colloid mill. Suitable emulsifying agents include, by way of example, the morpholine salts of fatty acids containing from 12 to 18 carbon atoms; the acetates of normal long-chain primary aliphatic amines containing from 12 to 18 carbon atoms; the esters of higher fatty acids such as oleic acid and stearic acid with various alcohols such as glycerol and polyethyleneglycol; the products of condensation of ethylene oxide with primary alcohols, polyols or phenols, and their esters with higher fatty acids.

The choice of the appropriate emulsifying agent is facilitated by the use of the following test: a filter paper of even porosity is impregnated with an aqueous nigrosine solution and there is then deposited thereon a drop of the organosilicic compound to be employed, containing the emulsifying agent to be tested. The time taken for the expulsion of the nigrosine by the mixture of organosilicic compound and emulsifying agent is measured in comparison with a standard transparency.

It is often desirable also to add to these emulsions a thickening agent acting as a stabiliser. Although a large number of products can satisfactorily perform this function, the following products are mentioned as being particularly advantageous: polyvinyl alcohol, polyvinyl acetal, polyvinyl chloride, polyvinyl acetate, acrylic and methacrylic compounds, alginates, butadiene latex, carboxymethyl cellulose, methylcellulose, starch, dextrin, vegetable gums, bentonite and metal soaps, especially copper, lithium and calcium soaps.

In some cases, it may be advantageous to use aqueous solutions of organosilicic derivatives. This may be effected in particular with siloxanols and more especially with the siloxanols obtained by the hydrolysis of methyltrichlorosilane. These are marketed in the form of solutions in aqueous sodium hydroxide or potassium hydroxide and commonly called "methylsiliconates" or "siliconates." Such solutions, however, are too alkaline to be used directly on plants. It is therefore necessary to neutralise this alkalinity without, however, causing agglomeration of the neutralised products, which would result in precipitation thereof. A convenient method of effecting this neutralisation consists in employing a highly polymeric organic acid, such for example as cellulose-carboxylic acid, polyacrylic acid, polymethacrylic acid, carboxymethacrylic acid or alginic acid, in the presence or absence of surface-active agents.

In order to facilitate the spreading of the organosilicic derivative on plants, it may be advantageous to add wetting agents to the aqueous compositions, solutions or emulsions. Thus, there may be dissolved in the aqueous phase agents such as: sodium or ammonium alkylnaphthalene sulphonate, terpene derivatives, aminoalcohol sulphonates, and products of condensation of ethylene oxide with an alcohol or a phenol.

The process of treatment according to the invention may be used in the following applications, given by way of non-limitative example:

Slowing down the transpiration and combatting dryness.
Combatting certain forms of fruit failure due to washing-off of pollen.
Physico-chemical stunting of vegetables.
Combatting shrivelling of cereals.
Use in the grafting art of promoting recovery.
Limitation of dehydration of plants due to transplantation and in the course of transport.
Dwarfing of shrubby and arborescent hebarceous plants, especially in ornamental horticulture.
Combatting withering of pathological and physiological origin.
Oriented or unoriented limitation of the growth of plants, for example in the case of hedges and trees bordering electric lines.
Disbudding (tobacco, vine and the like).
Retarding the flowering of horticultural and agricultural plants.
Retarding the ripening of fruit.
Increasing the resistance of plants; retarding budding and protecting against late frosts.
Preservation of agricultural products susceptible to depreciation: early plants, tubercles, seeds for consumption and sowing, flowering fruits and green plants.
Protection of plants against cryptogamic diseases.

When the treatment has the object of producing a delay in budding, the application of the organosilicic derivative is generally effective in a concentration of 0.1 to 0.2%. In other cases, such as the combatting of dryness, dwarfing or oriented limitation of the growth of plants, the organosilicic derivatives may be applied in much stronger concentrations, which may reach and even exceed 10%, on the parts of the vegetables concerned.

The process of treatment according to the present invention may be extended to mixtures of organosilicic derivatives and of products conventionally employed in the agricultural field, such as insecticides, fungicides, growth substances and fertilisers for spraying.

The activity of the products employed in accordance with the invention may be shown in the laboratory by tests comparing the quantities of water transpired in a given time by treated and untreated plants. A test of this type may be carried out with beans. Plants are chosen whose cotyledonary leaves are well developed, and the shoot of which is 0.5 cm. long. This shoot is cut off at the point just above the cotyledonary leaves. The leaves are then dipped in the products to be tested, brought to the appropriate dilution. When the applied material has dried out, each plant is introduced into a test-tube (130 cc.) containing 100 cc. of town water, and the position of the plant is so adjusted that the roots dip into the water, the cotyledonary leaves remaining outside the tube. The tubes are closed by carded cotton covered with two thicknesses of sticky paper. The transpiration of the plants is measured by determining the weight lost by the assembly of the tube, the plant and the water. The variations of weight due to the growth of the plants are negligible in relation to the variations due to transpiration.

Conveniently, such determinations may be carried out morning and evening, using from 10 to 12 plants for each product and for each concentration tested.

At the end of the test the leaf-blades are cut off from their petioles and are weighed with precision. In order to show the results, the loss of weight in 4 days is related to the weight of the leaf-blades, which gives the variations per unit weight, and the unit variations for plants treated are then expressed as a percentage of the unit variations of the comparison plants (averages on 10 to 12 plants).

The following are examples of compositions suitable for use according to the present invention.

EXAMPLE I

*Formula A*

20 g. of glycol and 10 g. of the product obtained by condensation of 10 mols ethylene oxide with 1 mol tert. dodecylmercaptan, were dissolved in 200 cc. of water, and there were then progressively added with good stirring:

Dimethylpolysiloxane oil (viscosity at 25° C.=50 centistokes) G. _____ 60
Mineral oil ($d_4^{20}$=0.855, distillation 321–415° C.) __ 600

After homogenisation of the mixture in a colloid mill, an emulsion of the oil-in-water type was obtained.

By proceeding in a similar manner three other formulae corresponding to the following compositions were prepared:

| | Formula | | |
|---|---|---|---|
| | B | C | D |
| Mineral oil _____ g__ | 600 | 600 | 600 |
| Silicone oil (50 cts.) _____ g__ | 60 | 60 | 60 |
| Water _____ g__ | 200 | 200 | 200 |
| Glycol _____ g__ | 20 | 20 | 20 |
| Product of condensation of 10 mols ethylene oxide with one mol octylphenol _____ g__ | 7.5 | 7.5 | 0 |
| Product of condensation of ethylene oxide with sorbitol _____ g__ | 0 | 3 | 0 |
| Ricinoleic acid _____ g__ | 0 | 0 | 3 |
| 2 N potassium hydroxide _____ cc__ | 0 | 0 | 5 |

EXAMPLE II

*Formula A*

990 g. of dimethylpolysiloxane oil (viscosity 1000 centistokes at 25° C.) were mixed with 10 g. of triethanolamine lauryl sulphate, and then diluted with 20 cc. of water. There was thus obtained an initial emulsion, to which there were gradually added 100 g. of the product of condensation of 10 mols ethylene oxide with 1 mol tert.dodecylmercaptan, and then 600 cc. of the same mineral oil as used in Example I. The paste obtained was then progressively diluted with 300 cc. of water.

Three other similar Formulae B, C and D were prepared by a similar procedure, but with dimethylpolysiloxane oils having a viscosity of 12,500, 30,000 and 100,000 centistokes at 25° C.

EXAMPLE III

An emulsion of the water-in-oil type was prepared in the following manner. There were successively added with vigorous stirring to 1,000 cc. of mineral oil as used in Example I:

Cc.
Product of condensation of 10 mols ethylene oxide with one mol oleic acid _____ 10
Fatty acid ester of the product of condensation of ethylene oxide with sorbitol _____ 20
Dimethylpolysiloxane oil _____ 100

Into the mixture thus obtained there was then poured still with vigorous agitation:

Cc.
Water _____ 3,600

The homogenisation of the mixture was completed in a colloid mill.

EXAMPLE IV 150 g. of oil-soluble silicone oil were dissolved in 593 g. of mineral oil as used in Example I and 150 g. of a product of condensation of 4 mols ethylene oxide with 1 mol lauryl alcohol was then added. There was thus obtained an oily concentrate which was self-emulsifying in contact with water.

EXAMPLE V

A solution for spraying was prepared by mixing the following:

| | G. |
|---|---|
| Oil soluble silicone oil | 20 |
| Mineral oil (as used in Example I) | 980 |

By applying the laboratory test described above to some of the formulae described in the foregoing examples these formulae having previously been diluted to lower the organosilicic derivative concentration to 0.1%, the following results were obtained:

| Formula Reference | Percentage loss in relation to the comparison specimen |
|---|---|
| Example I, Formula B | 60 |
| Example I, Formula C | 65 |
| Example II, Formula B | 70 |
| Example IV | 55 |

We claim:

1. A process for controlling the hydration level and evaporation of water from growing live plants which comprises applying thereto a composition comprising an organosilicic compound having a viscosity of 50 to 100,000 centistokes at 25° C. and a diluent therefor.

2. A process for controlling the hydration level and evaporation of water from growing live plants which comprises applying thereto a composition comprising an organosilicic compound having a viscosity of 50 to 10,000 centistokes at 25° C. and a diluent therefor.

References Cited in the file of this patent

UNITED STATES PATENTS

| 1,935,706 | Joffe | Nov. 21, 1933 |
| 2,523,281 | Currie | Sept. 26, 1950 |
| 2,698,809 | Fessenden | Jan. 4, 1955 |

OTHER REFERENCES

Publications: Holman et al.: "A Textbook of General Botany," published 1928 by John Wiley (N.Y.) second edition. Only pages 183, 184, 185, 306, 307 are relied on.

Patterson: "Silicone Resins," published November 1947 in Industrial and Engineering Chemistry (Magazine), vol. 39, pages 1376 through 1379.

Chemical Abstracts, vol. 50, columns 8120 and 8121. Published June 10, 1956, "Silicones as Lubricants for Pea-Seed Protectants."